Dec. 5, 1944.　　　F. E. THOMAS　　　2,364,253
TREAD-MILL TOY
Filed Jan. 18, 1943　　　2 Sheets-Sheet 1

Inventor:
Frank E. Thomas
By
Attorney

Dec. 5, 1944.    F. E. THOMAS    2,364,253
TREAD-MILL TOY
Filed Jan. 18, 1943    2 Sheets-Sheet 2
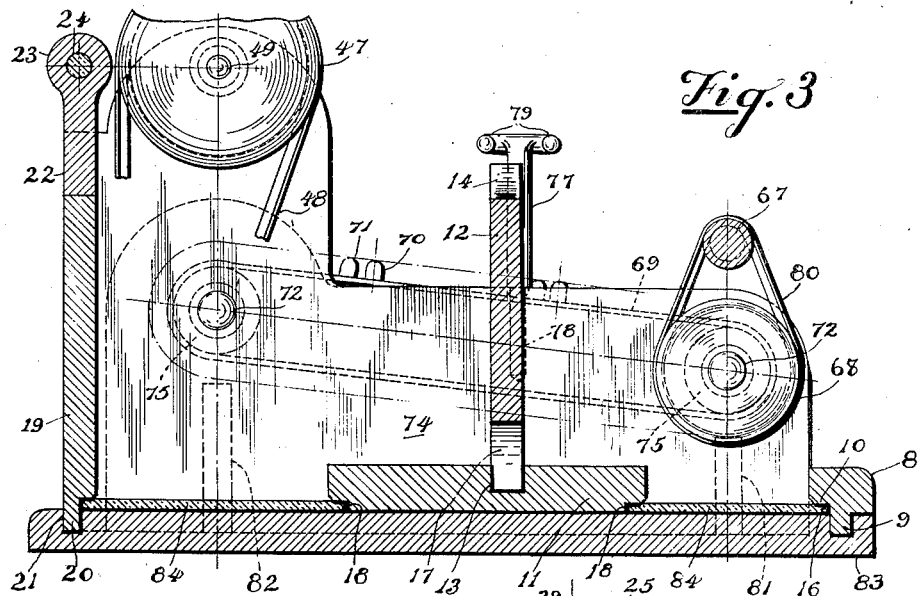
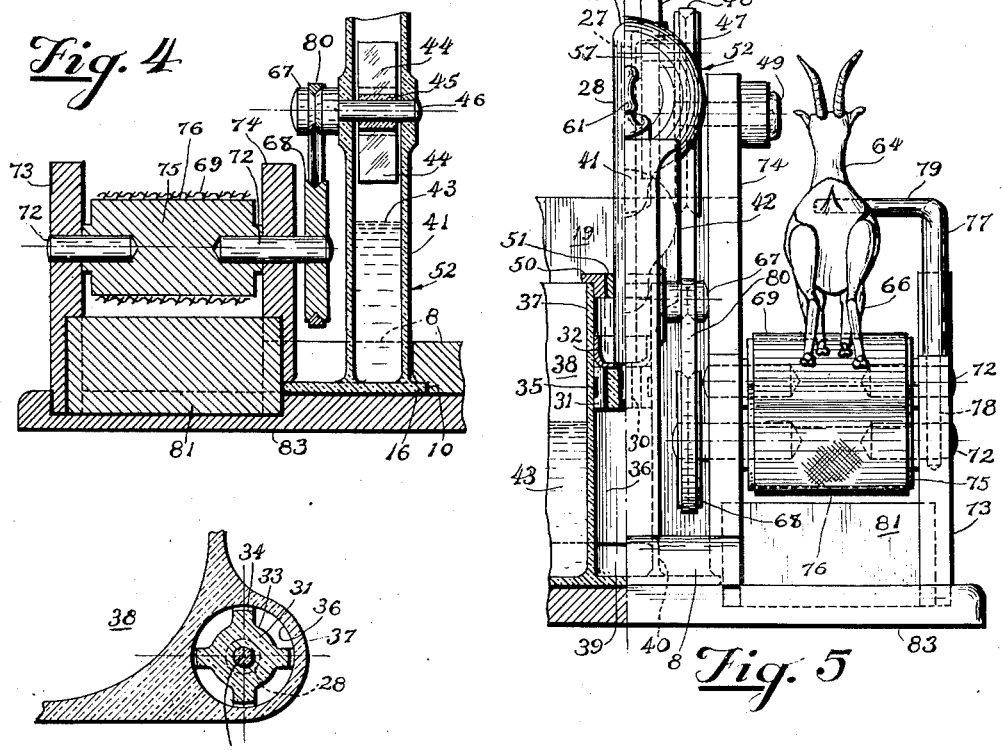
Inventor:
Frank E. Thomas
By (signature)
    Attorney Patented Dec. 5, 1944

2,364,253

UNITED STATES PATENT OFFICE 2,364,253

TREADMILL TOY

Frank E. Thomas, Chicago, Ill.

Application January 18, 1943, Serial No. 472,661

7 Claims. (Cl. 46—1)

This invention relates to toys and has for its primary object to produce an illusory effect, by indicating an animal robot operating a treadmill rendering the illusion of creating sufficient energy to operate a pumping mechanism, or the like, when in reality a concealed source of motive power actually operates the pumping unit to produce the movement of the animal, simulating its steady walking gait on a tread-mill structure; in other words, altho the device is operated by concealed motive power means, the illusion created is that the animal walking on the treadmill structure produces sufficient energy to operate a mechanical system in this particular instance a pumping unit.

Another object of this invention is to provide a liquid pumping unit in combination with pressure controlled structure which will provide a continuous pressure stream to operate rotor means in turn operating a tread-mill structure.

Another object of my invention is to provide power translation means between driving means and driven means, which will motivate the said driven means in one direction regardless of the direction of motivation of the said driving means.

Another object of my invention is to provide a tread-mill structure having staggered impediments so as to trip front and rear legs of an animal alternately thus simulating a walking gait of the said animal structure.

Another object of my invention is to provide a toy of the aforementioned character which is novel in construction, practical and efficient in its operation and which will provide an illusionary effect as hereinabove elucidated and which is of such simple construction as to warrant quantity production thereof at economical cost.

Other objects, features, and advantages inherent in my invention will become readily apparent from an examination of the accompanying drawings and the ensuing description wherein like numerals are used to designate like parts and in which;

Fig. 3 is a longitudinal cross-sectional view on the line 3—3 of Figure 1.

Fig. 4 is a longitudinal cross-sectional view on the line 4—4 of Figure 1.

Fig. 5 is a longitudinal cross-sectional view on the staggered line 5—5 of Figure 1.

Fig. 6 is a transversal cross-sectional view on the line 6—6 of Figure 2.

Figure 1:
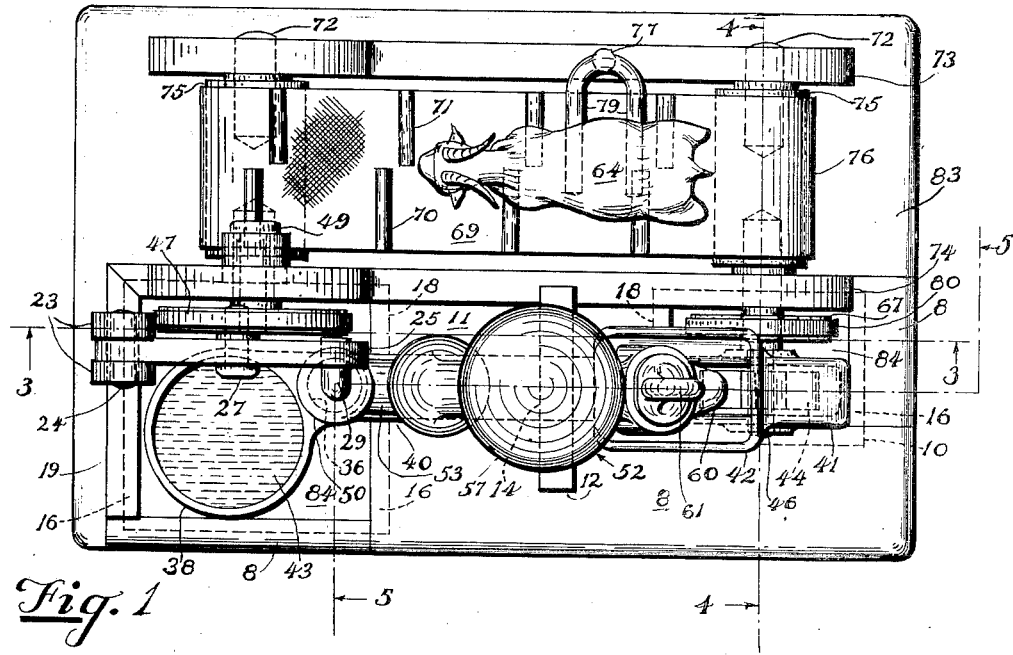
Fig. 1 is a top elevational view of my invention.

Referring to the accompanying drawings, my invention is, generally, designated by the numeral 7 and its comprises a base 83 which is provided with suitable channel recesses 21 to accommodate the tongues 9 of the molding 8, also to receive the tennon 20 of the support 19. Several pieces of molding 8 are used in order to secure the circulating means comprising a part of my invention, by virtue of the flanges 16 which are clamped within the recess portions 10 of the molding 8 and the intermediate molding piece 11 being provided with recesses 18 to clamp the said flange 84 firmly in place. The molding member 11 is also provided with a slotted portion 13 to receive the support 12. The support 12 which is recessed at 17 in order to furnish clearance for the connecting tube 40 connecting the receiving trough 41 and the storage trough 38 as will hereinafter be elucidated and described. The support 12 also has a V recess 14 in its top in order to cradle the portion 15 of the force pump unit generally designated 52 superimposed therein.

The pumping structure is comprised of a reservoir 38 which contains a pumping guide cylinder, generally, designated 37 and which has an opening therein 36 into which is fitted the pump piston 31. The pump piston 31 is preferably bored out to receive the shoulder 30 of the pump rod 28 which is bent as shown at 29 in order to slidably fit within the recess 26 of the link 25. The piston 31 which as shown in Figure 6 is provided with recesses 33 which resolve its periphery into four spoke-like projections 34 which are also relieved longitudinally as at 35 in order to minimize the frictional contact between the pump piston 31 and the opening 36 within the cylinder 37. Between the pump rod 28 and the piston 31, I secure a cup of soft resilient material 32, and its purpose or operation will later be elucidated. The pumping unit, the reservoir 38, the connecting pipe 40, and the trough 41 are connected by means of by-pass 39 permitting a liquid to circulate freely therein.

At the top of the recessed tube 37 and within the recess 36 is fitted a cork bushing designated 50 within which a compressed felt or resilient member 51 is placed in order to act as a gland for the moving plunger 28 which operates vertically and alternately up and down. The movement of the plunger 28 in a downward direction causes the resilient side walls of the cup 32 to be compressed toward the center of the structure thus allowing the liquid 43 to by-pass freely, the piston 31 thus offers no resistance to the liquid pressure exerted against the piston 31 when moved in a downward direction, the liquid being caused to by-pass by virtue of the recesses 33; however, when the pump rod 28 is moved in an upward direction the liquid weight accumulated above the resilient cup 32 will force the outer edges of the cylindrical portion of the said cup to adhere closely and seal the opening 36 thus causing the liquid to be lifted and passed on into the recess within section 53, wherein the liquid forces the ball valve 55 upward permitting the liquid to pass into the conduit portion 56; moreover, should the liquid thus accumulated be pumped more rapidly than it can be dispensed thru the nozzle section 60, the air 59 within the globular chamber 57 will be compressed by virtue of the rise of the surface 58 of the liquid, hence on the downward stroke the expansion of the compressed air 59 will cause the stream jet from the nozzle 60 to be continuous thus offering a continual steady rotation to the rotor 45. The jet coming from the nozzle 60 may be controlled by adjustment of the pet-cock structure 61 which is provided with a resilient liner member 63 made of cork or other suitable material so as to offer a neat cushioning effect and provide proper sealing preventing seepage at the valve outlet 62.

To confine the jet of liquid to the rotor, the nozzle 60 is angularly positioned as shown, and the top of trough 41 is preferably flared outwardly as shown at 42. When the compressed air 59 expands and drives the liquid out thru the nozzle 60, at the same time liquid pressure exerted to the left of pressure bell 57 will cause the ball valve 55 to seal against the reduced neck portion 54 thus not impeding operation of the pump mechanism. The pumping unit is operated by the link 25 which has a slotted portion 26 secured to a stud 27 which in turn is eccentrically positioned and secured to the V groove pulley 47 rotated by the V belt member 48 the said V belt member being connected to a concealed source of motive power which may be an electric motor, or a spring wound motor, or any other suitable motive power means which is concealed either in a compartment provided below the base, or concealed in any suitable manner not indicated on the drawings.

Figure 2:
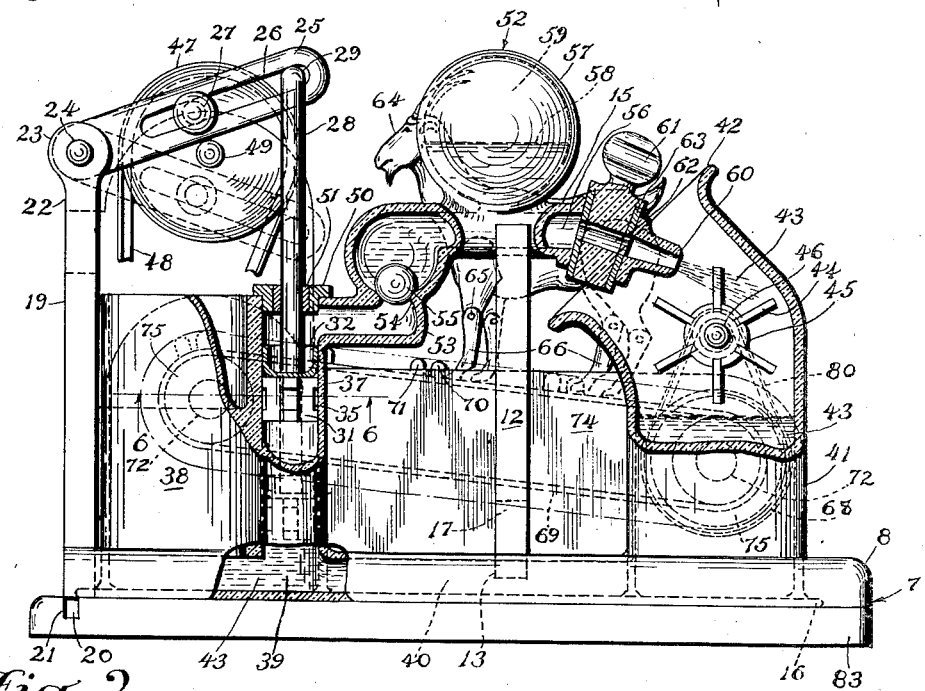
Fig. 2 is a front elevational view of my invention with certain fragmentary longitudinal cross-sectional portions shown, in order to more clearly depict the nature of the construction and operation of my invention.

The link member 25 is, preferably, pivoted in the dual bearing member 22 having geared portions 23 to receive the pivot pin 24 to which the link member is pivotably secured, its motion being confined to the dotted and full lines in Figure 2.

The tread-mill arrangement is comprised of a bearing plate member 73 and a plate member 74 to which rollers 75 having bearing pins 72 are rotatably secured. The said bearing plates 73 and 74, may be reinforced by stays 81 and 82 rabbeted thereto and as well to the base 83. The said roller members 75 are, preferably, slightly crowned on their center portions 76 in order to confine the movement of the continuous endless belting 69 in alignment therewith, and in order to prevent the belting 69 from running off sidewise on the said rollers 75. The belting may be made of a resilient or a textile material so that its elasticity will tend to hold the same frictionally in contact with the rollers 75 at all times. The continuous belting member 69 is provided with slats 70 and 71 which are positioned in staggered relationship as indicated in order to trip alternately the right and left front and rear legs 66 of the animal 64; the said legs being suitably pivoted at 65 in order to permit the said slats 70 and 71, respectively, to trip the said legs alternately as hereinbefore stated. The slats 70 are evenly spaced around the surface of the belting 69, and as well the slats 71 are also evenly spaced. The distance between slats being not less than the distance between front and rear legs of the animal robot 64, so as to permit the legs to be tripped slowly and intermittently, the speed of the tread-mill being rather slow.

The animal 64 is, preferably, supported on a bifurcated member 77 which has supporting prongs 79 inserted and glued or otherwise secured to the animal 64. The member 77 is provided with a reduced shank portion 78 which is driven into a suitable opening in the plate or bearing member 73. The pulley 47 is pivoted at 49 on an extended bearing portion provided on the top of element 74 so that it will permit the said pulley to rotate freely and allow the eccentric button 27 to work freely within the slotted portion 26 of the link 25, thus causing the link to work within the confines of the full and dotted lines indicated in Figure 2; this will cause the pump rod 28 to be moved up and down and thus cause the pump to operate by pumping the liquid within the confines of the circulating structure comprised of elements 41, 40, 37, and the reservoir 38, causing the same to circulate by means of the force feed pressure structure 52 causing liquid to be forcefully ejected thru the nozzle 60 operating the rotor 45 by virtue of the series of vanes 44 which are fixedly secured thereto. The rotor 45 is pivoted at 46 and is secured to the V grooved pulley 67 which by virtue of belting member 80 is connected to pulley 68, it in turn being fixedly secured to one of the roller elements 75 supporting the tread-mill belting structure heretofore mentioned and described.

The circulating structure has been, preferably, indicated to be made of glass and the support structure may be made of wood or any other material. Altho glass has been indicated, any transparent plastic substance may be used for making this toy.

Altho I have shown and indicated a preferred form of my invention, made of materials that at the present time are not considered critical war materials, I realize that the invention is susceptible of many improvements, hence, I reserve the right to change or modify this construction within the spirit and scope of my invention, and within the purview of the foregoing description; my invention to be limited only by the subjoined claims.

Having thus described and revealed my invention what I claim as new and desire to secure by Letters Patent is:

1. In a toy of the character described, endless belt means, tread-mill means, comprising a prime series of traction elements evenly spaced and mounted thereupon, and a second series of traction elements evenly spaced mounted in staggered relationship to the said prime series of traction elements, and continuously circulating fluid pressure motivating means including force pump means provided with an air chamber and nozzle means capable of forming a fluid jet adapted to operate the said tread-mill means.

2. In a toy of the character described, a robot figure its body rigidly supported having articulate pedal extremities, tread-mill means comprising, endless belt means, a prime series of traction elements mounted thereupon, and a second series of traction elements mounted thereupon in staggered relationship to the said prime series of traction elements, and continuously circulating fluid pressure motivating means including force pump means provided with an air chamber and nozzle means capable of forming a fluid jet adapted to operate the said tread-mill means.

3. In a toy of the character described, power transmission means comprising, driving means, liquid circulating means comprising, reciprocating force pump means provided with an air chamber, adjustable valve means associated with said pump means adapted to vary the pressure of a jet of liquid expelled therethru, trough means adapted to receive the said expelled liquid, and rotor means secured rotatably to the said trough means adapted to be rotated by the pressure of said expelled jet of liquid.

4. In a toy of the character described, tread-mill means comprising, endless belt means, a prime series of traction elements evenly spaced and mounted thereupon, a second series of traction elements evenly spaced mounted in staggered relationship to the said prime series of traction elements, a robot figure its body rigidly supported having articulate pedal extremities, the said prime and second series of traction elements adapted to motivate each of the said pedal extremities, alternately, one at a time, and continuously circulating fluid pressure motivating means including force pump means provided with an air chamber and nozzle means capable of forming a fluid jet adapted to operate the said tread-mill means.

5. A toy of the character described comprising, a base, reciprocating force pump means mounted thereupon, tread-mill means cooperating with the said reciprocating force pump means adapted to motivate said tread-mill means, eccentric means mounted on the said base adapted to operate the said reciprocating force pump means, and robot means rigidly mounted provided with articulate pedal extremities, the said tread-mill means provided with staggered traction elements adapted to motivate each of the said pedal extremities, alternately, one at a time.

6. In a device of the character described, power transmission means comprising, driving means, driven means, and continuously circulating fluid pressure means including force pump means provided with an air chamber and nozzle means capable of forming a fluid jet adapted to translate power and motion imparted by the said driving means to the said driven means.

7. Power transmission means comprising, continuously circulating fluid pressure including force pump means provided with an air chamber and nozzle means capable of forming a fluid jet means interposed between driving means and driven means.

FRANK E. THOMAS.